US007686685B2

(12) United States Patent
Englman et al.

(10) Patent No.: US 7,686,685 B2
(45) Date of Patent: Mar. 30, 2010

(54) WAGERING GAME HAVING PLAYER SELECTION FEATURES HAVING REDUCED VOLATILITY INDEX

(75) Inventors: Allon G. Englman, Chicago, IL (US); Jeremy M. Hornik, Chicago, IL (US); Michael W. Mastropietro, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 1170 days.

(21) Appl. No.: 10/872,657

(22) Filed: Jun. 21, 2004

(65) Prior Publication Data

US 2005/0282615 A1 Dec. 22, 2005

(51) Int. Cl.
*A63F 13/00* (2006.01)

(52) U.S. Cl. .................................... 463/20; 273/143 R

(58) Field of Classification Search .................. 463/16, 463/20; 273/143 R, 139, 138.2; 350/174
See application file for complete search history.

(56) References Cited

U.S. PATENT DOCUMENTS 4,991,848 A * 2/1991 Greenwood et al. ........... 463/21
5,393,067 A 2/1995 Paulsen et al. .............. 273/292
5,720,662 A 2/1998 Holmes, Jr. et al. ........... 463/20
5,788,573 A * 8/1998 Baerlocher et al. ............ 463/16
5,833,538 A 11/1998 Weiss .......................... 463/21
5,879,234 A 3/1999 Mengual ...................... 463/20
5,888,136 A 3/1999 Herbert ....................... 463/22
6,068,552 A 5/2000 Walker et al. ................. 463/21
6,159,097 A * 12/2000 Gura ........................... 463/20
6,190,255 B1 * 2/2001 Thomas et al. ................ 463/20
6,290,603 B1 9/2001 Luciano, Jr. ................. 463/21
6,302,791 B1 10/2001 Frohm et al. .................. 463/25
6,315,664 B1 * 11/2001 Baerlocher et al. ............ 463/21
6,485,367 B1 11/2002 Joshi ........................... 463/13
6,561,899 B2 * 5/2003 Vancura ....................... 463/16
2005/0043085 A1 * 2/2005 Baerlocher ................... 463/25

* cited by examiner

*Primary Examiner*—Peter DungBa Vo
*Assistant Examiner*—Masud Ahmed
(74) *Attorney, Agent, or Firm*—Nixon Peabody LLP

(57) ABSTRACT

A method for conducting a wagering game on a gaming terminal comprises displaying a plurality of player-selectable elements that initially mask a value, at least one of the player-selectable elements comprises an end-game outcome having a variable value, and in response to a player selecting one of the player-selectable elements that is not the end-game outcome, revealing the value of the selected one of the player-selectable elements and decreasing the value of the end-game outcome.

23 Claims, 7 Drawing Sheets

WAGERING GAME HAVING PLAYER SELECTION FEATURES HAVING REDUCED VOLATILITY INDEX

FIELD OF THE INVENTION

The present invention relates generally to wagering games and, more particularly, to a wagering game having a reduced volatility index.

BACKGROUND OF THE INVENTION

Gaming terminals, such as slot machines, video poker machines and the like, have been a cornerstone of the gaming industry for many years. Generally, the popularity of such machines with players is dependent on the likelihood (or perceived likelihood) of winning money at the gaming terminal and the intrinsic entertainment value of the machine relative to other available gaming options. Where the available gaming options include a number of competing machines and the expectation of winning on each machine is roughly the same (or believed to be the same), players are most likely to be attracted to the most entertaining and exciting machines. Shrewd operators constantly strive to employ the most entertaining and exciting machines available because such machines attract frequent play and, hence, increase profitability to the operator.

One method of attracting players to gaming terminals is by providing a bonus game in addition to a basic game. Generally, bonus games provide a greater expectation of winning than the basic game alone. According to one type of bonus game, a plurality of player-selectable symbols or windows are provided and the selection of which reveals a bonus-credit award that is initially covered by the symbol. The player continues to make selections and accumulate awards until an end-bonus outcome is uncovered. Thus, if a player initially selects a symbol covering the end-bonus outcome, the player receives no bonus award. This selection-type game, wherein a selection may award credits or end the game, is generally considered to have a high volatility index. "Volatility index" is a mathematical value that is the industry standard for measuring distribution of sizes and probabilities of slot machine payoffs and is described in further detail in U.S. Pat. No. 6,302,791, which is incorporated herein by reference in its entirety. For example, standard slot machines have a relatively steady payoff progression and, thus, are considered to have low volatility indices, which means that there is a relatively steady progression of many payoff values from the lowest to the highest, with each payoff corresponding probability decreasing as the value of the payoff increases. On the other hand, the described selection-type bonus game has a high volatility index. The present invention is directed to moderating the level of volatility in a selection-type game.

SUMMARY OF THE INVENTION

According to one embodiment of the present invention, a method for conducting a wagering game on a gaming terminal is disclosed. The method comprises displaying a plurality of player-selectable elements that initially mask a value, wherein at least one of the player-selectable elements comprises an end-game outcome having a variable value, and in response to a player selecting one of the player-selectable elements that is not the end-game outcome, revealing the value of the selected one of the player-selectable elements and decreasing the value of the end-game outcome.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
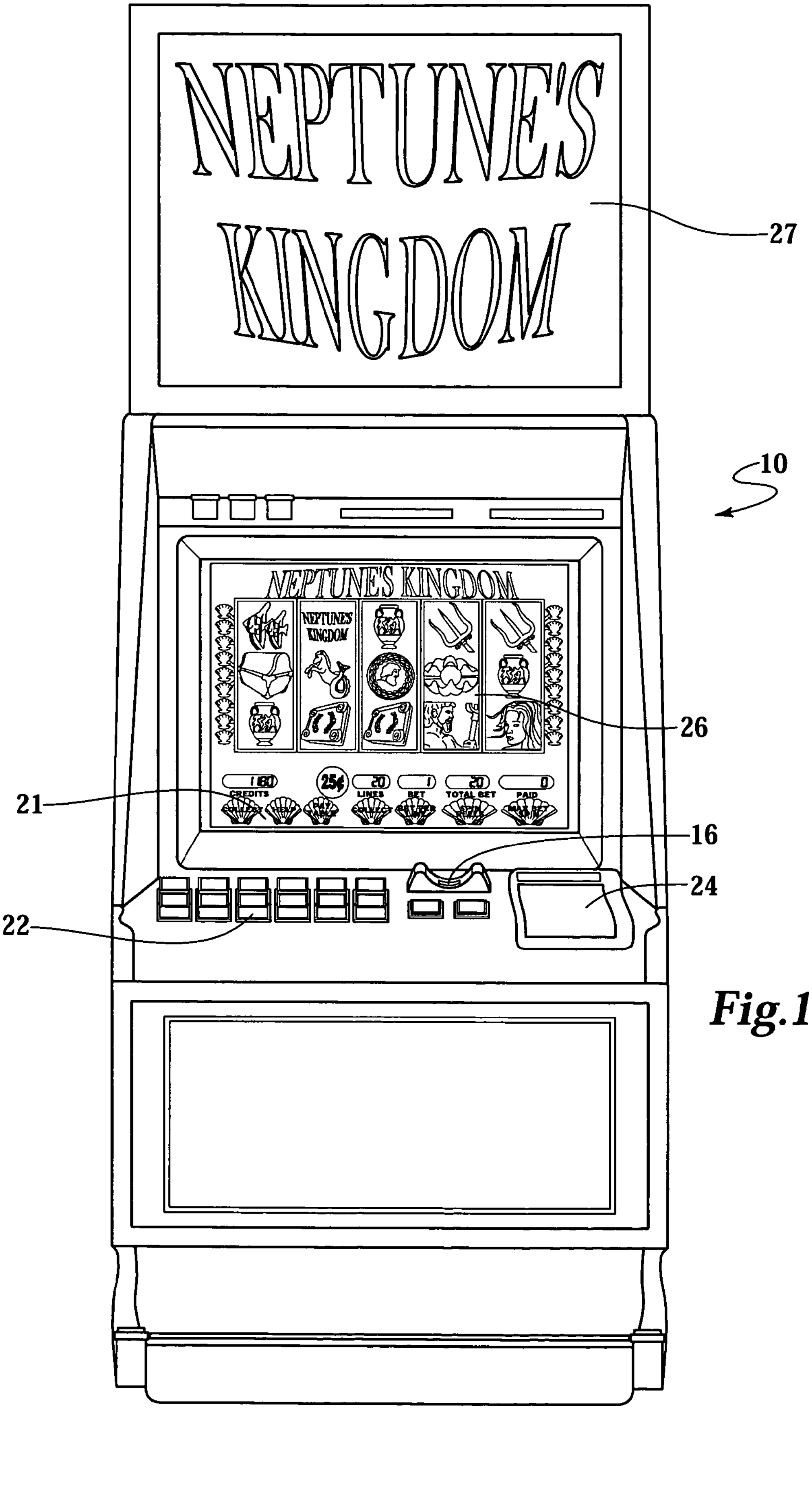
FIG. 1 illustrates a gaming terminal that is useful for operating a wagering game having a reduced volatility index according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a video casino game such as, for example, blackjack, slots, keno, poker, etc.

The gaming terminal 10 includes input devices, such as a wager acceptor 16, a touch screen 21, a push-button panel 22, and a player-identification card reader 24. For outputs, the gaming terminal 10 includes a main display 26 for displaying information about a basic wagering game such as slots. The main display 26 can also display information about a secondary bonus game. Alternatively, the gaming terminal 10 includes a secondary display 27 for displaying the secondary bonus game. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The wager acceptor 16 may include a coin slot acceptor or a currency note acceptor to input value to the gaming terminal 10. Or, the wager acceptor

16 may include a card-reading device for reading a card that has a recorded monetary value with which it is associated. The card may also authorize access to a central account which can transfer money to the gaming terminal 10.

The push button panel 22 is typically offered, in addition to the touch screen 21, to provide players with an option of how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 can also display a secondary bonus game associated with the basic wagering game. Alternatively, a bonus game is displayed on a secondary display 27. The main display 26 and the secondary display 27 may take the form of a cathode ray tube (CRT), a high resolution LCD, a plasma display, LED, or any other type of video display suitable for use in the gaming terminal 10. As shown, the main display 26 includes a touch screen 21 overlaying the entire monitor (or a portion thereof) to allow players to make game-related selections. Similarly, a touch screen may overlay the secondary display 27. Alternatively, the gaming terminal 10 may have a number of mechanical reels to display the game outcome as is known in the art.

The player-identification card reader 24 allows for identification of a player by reading a card with information indicating the player's true identity. Currently, the identification is used by casinos for rewarding certain players with complimentary services or special offers. For example, a player may be enrolled in the gaming establishment's players' club and may be awarded certain complimentary services as that player collects points in the player's player-tracking account. The player inserts the player's card into the player-identification card reader 24, which allows the casino's computers to register that player's wagering at the gaming terminal 10.

Figure 2:
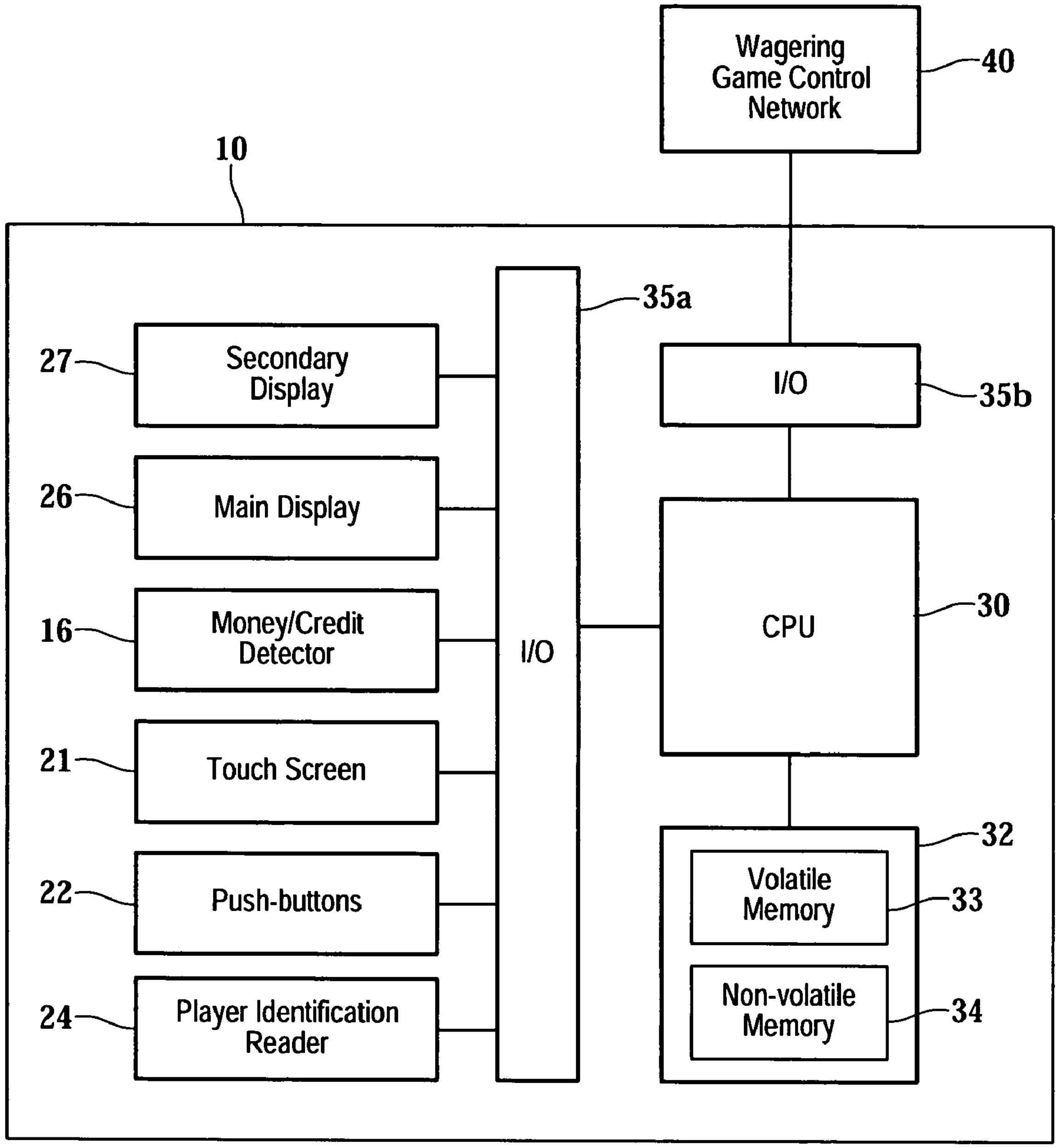
FIG. 2 illustrates a control system that is used in conjunction with the gaming terminal of FIG. 1.

Referring also to FIG. 2, the various components of the gaming terminal 10 are controlled by a central processing unit (CPU) 30 (such as a microprocessor or microcontroller). To provide the gaming functions, the CPU 30 executes a game program. The CPU 30 is also communicatively coupled to or includes a system memory 32. The system memory 32 may comprise a volatile memory 33 (e.g., a random-access memory, "RAM") and a non-volatile memory 34 (e.g., an EEPROM). It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

The gaming terminal 10 is typically operated as part of a game control network 40 having control circuitry and memory devices, wherein a plurality of gaming terminals are coupled to the game control network 40. The game control network 40 can be the game controller that controls operation of the basic game, the bonus game, or a combination thereof, as described below. For example, instead of the CPU 30, the game control network 40 may determine the random outcomes for games conducted on the gaming terminal(s) 10. Alternatively, the CPU 30 randomly determines the game outcomes.

The gaming terminal 10 often has multiple serial ports, each port dedicated to providing data to a specific host computer system that performs a specific function (e.g., accounting system, player-tracking system, etc.). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 40). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 40.

Figure 3:
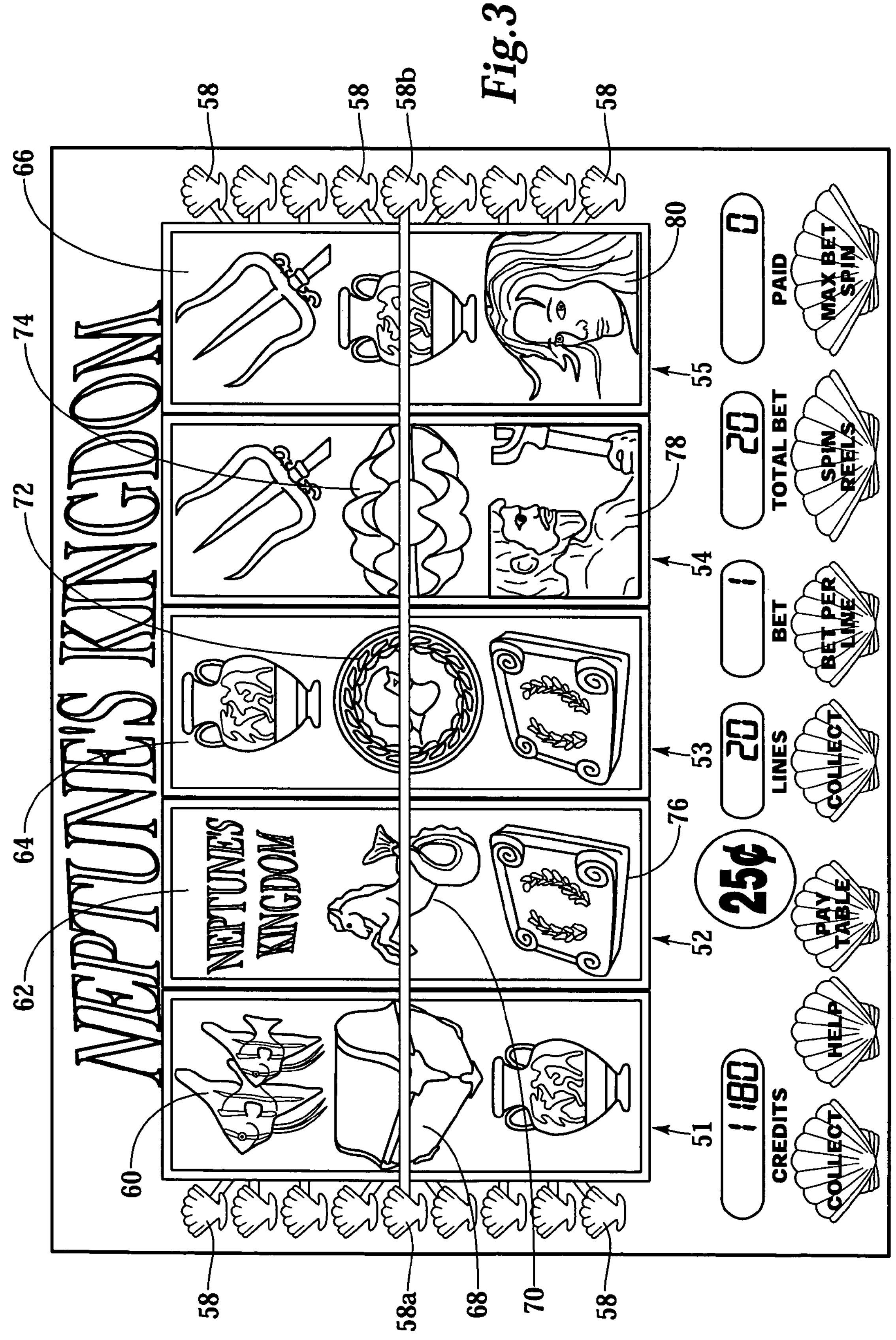
FIG. 3 illustrates an enlarged view of the reels for the gaming terminal of FIG. 1.

Referring also to FIG. 3, a portion of the main video display 26 is illustrated. A player begins play of the basic wagering game by inserting a wager input into the wager input accepter 16 of the gaming terminal 10. A player can select play by either using the touch screen 21 or push-button panel 22. The CPU 30, or the wagering game control network 40 in alternative embodiments, operates to execute a basic game program causing the main video display 26 to display the basic game that includes a plurality of simulated spinning reels 51-55 (FIG. 3) with symbols displayed therein. The reels 51-55 are stopped such that the symbols are displayed relative to a payline, yielding a plurality of outcomes of the basic game. Such outcomes are randomly selected, and one of the plurality of randomly selected outcomes is a start-bonus game outcome as discussed below. The number of activated paylines typically corresponds to the number of credits played. Payline indicators 58 are displayed on both sides of the reels 51-55. For example, activated-payline indicators 58*a* and 58*b* indicate an activated-horizontal-center payline extending between activated payline indicators 58*a* and 58*b* in FIG. 3.

In FIG. 3, the five depicted reels 51-55 have a plurality of symbols displayed thereon and one activated payline extending between payline indicators 58*a* and 58*b*. The depicted symbols all correspond to a "NEPTUNE'S KINGDOM" theme and include "FISH" symbols 60, "NEPTUNE'S KINGDOM" symbols 62, "VASE" symbols 64, "PITCH FORK" symbols 66, "TREASURE CHEST" symbols 68, "SEA HORSE" symbols 70, "COIN" symbols 72, "PEARL OYSTER" symbols 74, "TABLET" symbols 76, "NEPTUNE" symbols 78, and "SALACIA" symbols 80. Other NEPTUNE'S KINGDOM-themed symbols may also be depicted. In other embodiments of the present invention, the gaming terminal 10 may portray other themes with corresponding like-themed reel symbols. Further, standard gaming symbols such as "1-BAR" symbols, "2-BAR" symbols, "3-BAR" symbols, "CHERRY" symbols, "SEVEN" symbols, and "BELL" symbols may be depicted on the reels 51-55 in other embodiments.

A winning combination occurs when the symbols appearing on the reels 51-55 correspond to one of the winning symbol combinations listed in a pay table stored in the memory 32 of the gaming terminal 10. The pay table may also be displayed on the secondary display 27. Such winning combinations are displayed relative to one or more paylines.

The activated paylines extend between activated pairs of payline indicators 58 such as, for example, the payline that extends between payline indicators 58*a* and 58*b*. Winning combinations listed in the pay table can include three like-symbols appearing on a payline yielding a first payout, and four like-symbols appearing on a payline yielding a second, larger payout. For example, three VASE symbols 64 appearing on a payline yield five credits, and four FISH symbols 60 appearing on a payline yield fifteen credits. The symbol types may be weighted according to the frequency at which they appear on the reels 51-55. For example, three PEARL OYSTER symbols 74 on a payline yield twenty credits whereas three COIN symbols 72 on a payline yield thirty credits. Other symbol types, such as, for example, the NEPTUNE'S KINGDOM symbols 62, may represent wild symbols that are combined with two or more other symbols to complete a winning combination of symbols as reflected in the pay table.

Other schemes are implemented in various embodiments such as varying the winning amount for a particular symbol combination according to the particular payline with which the symbol combination is aligned. For example, three NEPTUNE symbols 78 aligned with the first payline 58*a*-58*b* may yield twenty credits, while three NEPTUNE symbols 78 aligned with a second or third payline may yield one hundred credits. Many other symbol combinations relative to the plurality of paylines and corresponding payouts are listed in the pay table of the gaming terminal 10.

Figure 4:
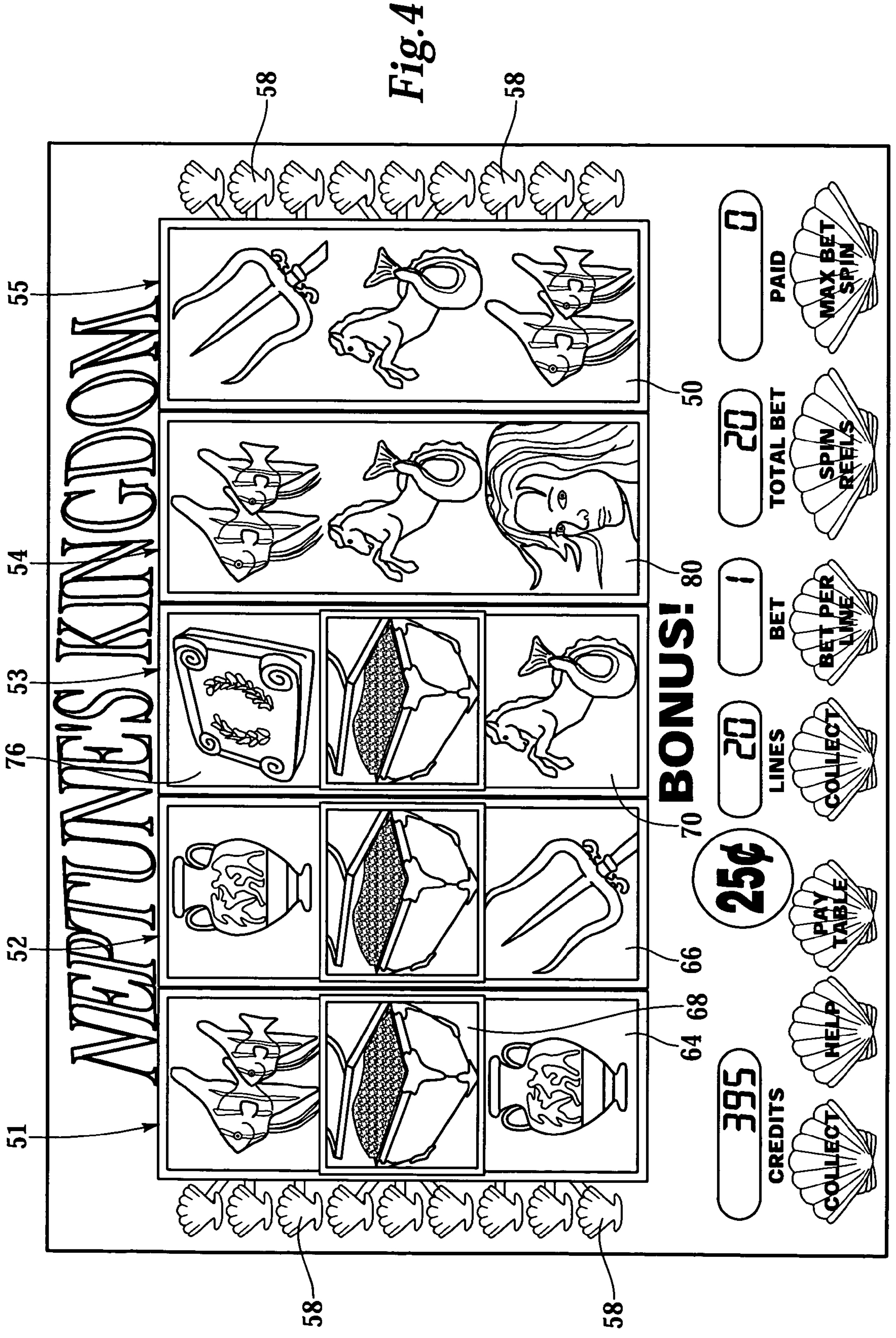
FIG. 4 illustrates an enlarged view of the reels for the gaming terminal of FIG. 1, wherein the displayed symbol arrangement corresponds to a start-bonus outcome according to one embodiment of the present invention.

Referring to FIG. 4, other outcomes cause the CPU 30 (or the game control network 40) to initiate a bonus game, and the CPU 30 switches from operating in a basic-game mode to operating in a bonus-game mode. For example, the CPU 30 initiates a bonus game when three or more TREASURE CHEST symbols 68 appear on the main video display 26, as illustrated in FIG. 4. The TREASURE CHEST symbols 68 may animate and open when the outcome triggers the bonus game as shown. Alternatively, a bonus game is triggered when one or more bonus-game-triggering symbols are displayed on specific reels 51-55 and are aligned with a payline—e.g., TREASURE CHEST symbols 68 appearing on the first, second, and third reels 51-53 are aligned with an activated payline (e.g., activated payline 58*a*-58*b* of FIG. 3). Alternatively still, the CPU 30 only initiates the bonus game when a player has wagered a predetermined number of credits (e.g., the maximum number of credits), and a combination of bonus-game-triggering symbols are aligned on specific reels 51-55, aligned along specific paylines, or both. The latter embodiment encourages players to wager the maximum number of credits. One or more of many different combinations of symbols 60-80, reels 51-55, paylines, number of credits wagered, or combinations thereof may be used to trigger the bonus round. The bonus game generally supplements the payoff in the pay table corresponding to the symbol combination on the reels.

Figure 5:
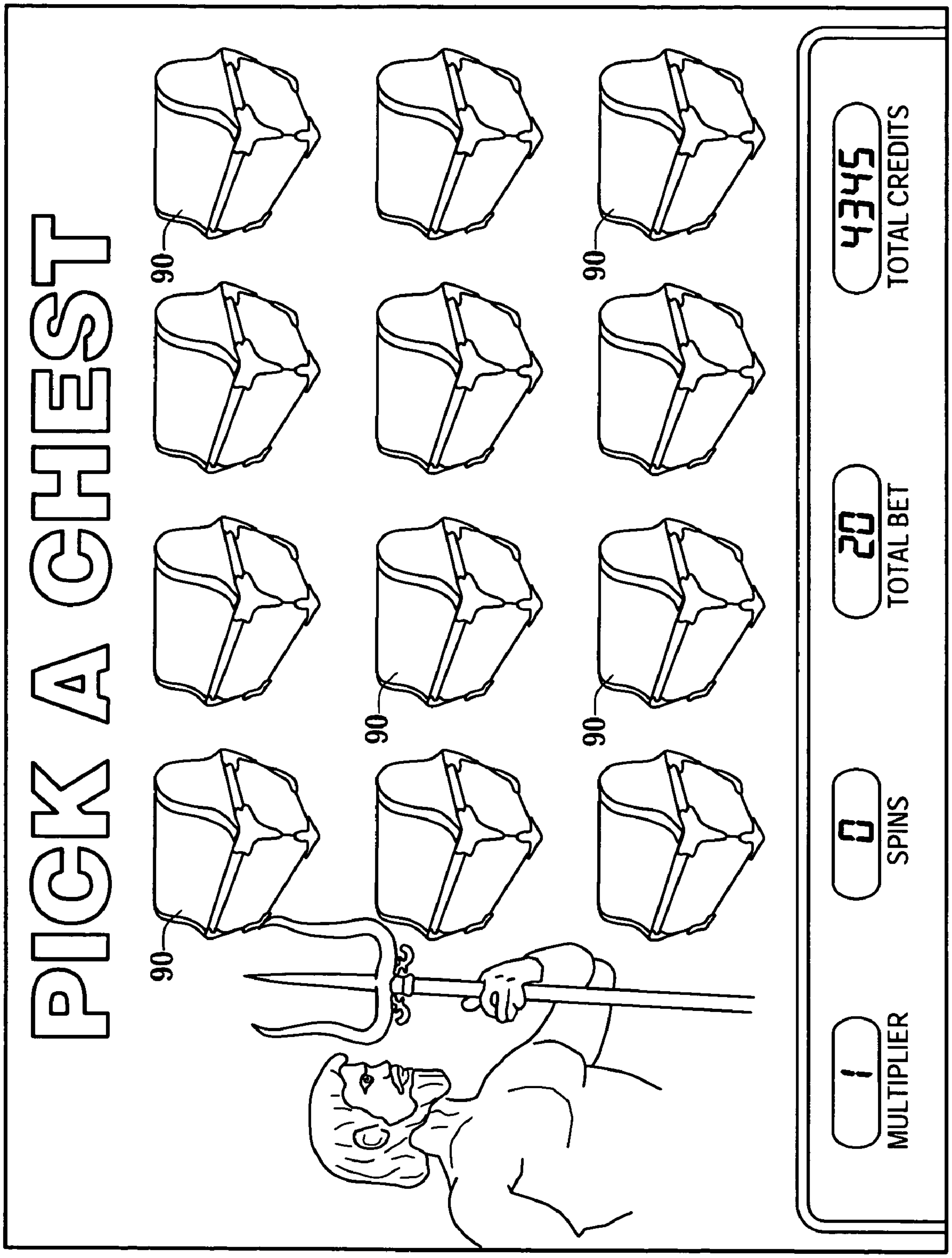
FIG. 5 illustrates player-selectable symbols displayed on the gaming terminal of FIG. 1 during a bonus game according to one embodiment of the present invention.

Turning now to FIG. 5, the CPU 30 (or the game control network 40 in an alternative embodiment) activates the secondary display 27 upon initiation of the bonus game. Alternatively, the bonus game is conducted on the main video display 16. FIG. 5 illustrates a portion of the second video display 27 during the bonus game wherein a plurality of player-selectable "TREASURE CHEST" symbols 90 are displayed thereon. The CPU 30 randomly determines a plurality of bonus-game outcomes, each of which is masked by a TREASURE CHEST symbol 90. The selection of each TREASURE CHEST symbol 90 causes the CPU 30 to reveal the outcomes associated with that particular TREASURE CHEST symbol 90.

Each TREASURE CHEST symbol 90 is associated with one of a plurality of bonus-game outcomes. The bonus-game outcomes may include an award of a number of credits, free spins, multipliers, or a combination thereof. The multiplier award may be applied to the total credits awarded, if any, in the bonus game or to the player's subsequent play of the basic game in various alternative embodiments of the present invention. The bonus-game outcomes also include an end-bonus outcome, which ends the bonus game according to one embodiment of the present invention.

Unlike other wagering games, the end-bonus outcome has an award of value associated therewith according to one embodiment of the present invention. The value of this award is a function of the number of selections it takes a player to select the end-bonus outcome. For example, the end-bonus outcome includes an award of a number of free spins. As the user selects the TREASURE CHEST symbols 90, prior to selecting the TREASURE CHEST symbols 90 covering the end-bonus/free-spin award, the user accumulates the end-bonus outcomes under those symbols such as, for example, free spins and credits. At the same time, the number of free spins awarded with the end-bonus/free-spin award "under" one of the TREASURE CHEST symbols 90 is decreased by the CPU 30. The decreasing rate of the number of free spins as TREASURE CHEST symbols 90 are selected may have a linear, stepped, or logarithmic profile stored in memory 32 depending on the desired rate of decrease. Thus, selection of the TREASURE CHEST symbol 90 covering end-bonus/free-spin award early on in the selection process results in a higher number of free spins than if selected later in the selection process. In an alternative embodiment of the present invention, the end-bonus outcomes may have an award of a number of credits associated therewith, wherein the number of credits decreases as a player makes TREASURE CHEST-symbol 90 selections. Alternatively still, the end-bonus outcomes may have a multiplier award of a number of credits associated therewith, wherein the value of the multiplier award decreases as a player makes TREASURE CHEST-symbol 90 selections.

Figure 6:
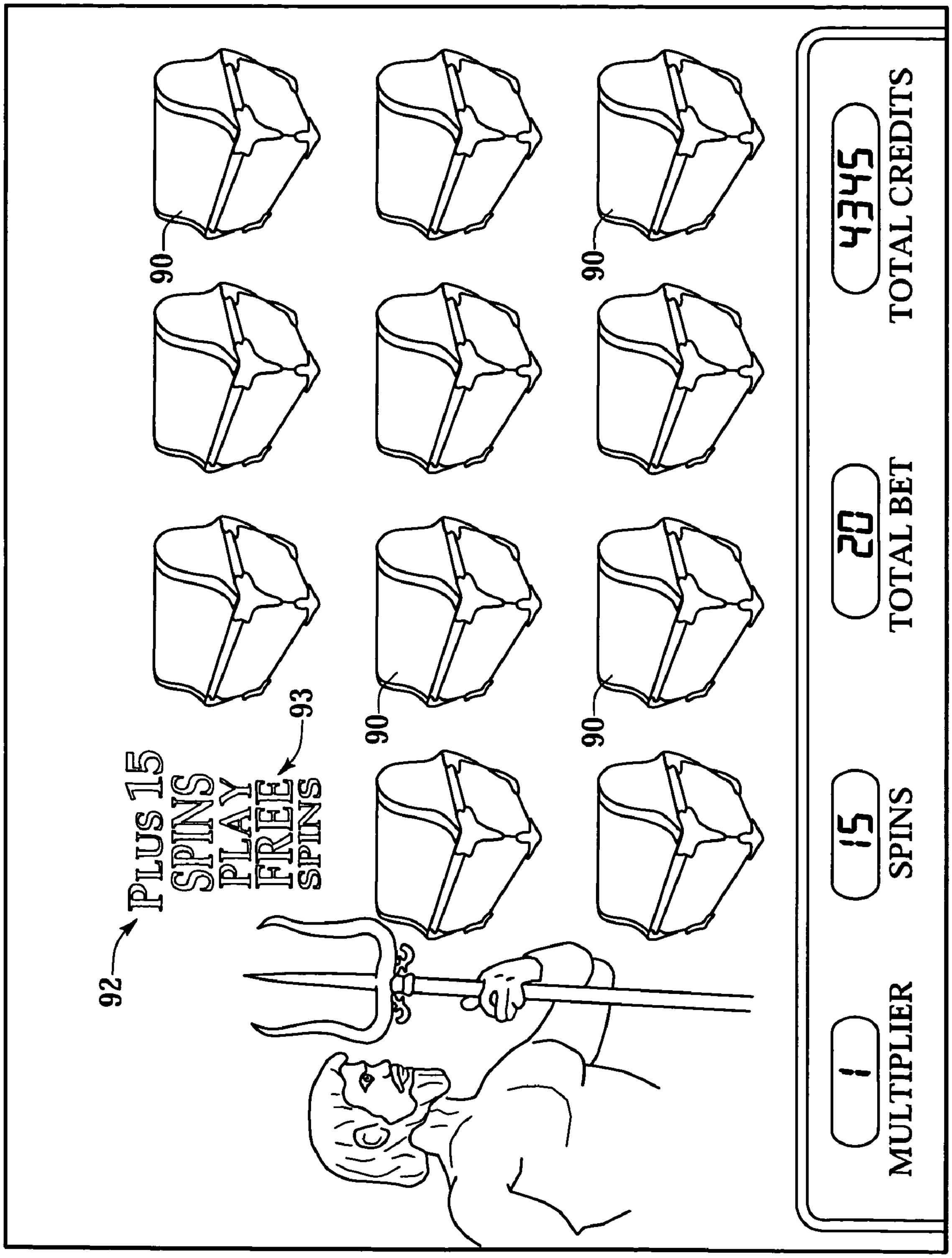
FIG. 6 illustrates an example of the selection of the player-selectable symbols of FIG. 5.
Figure 7:
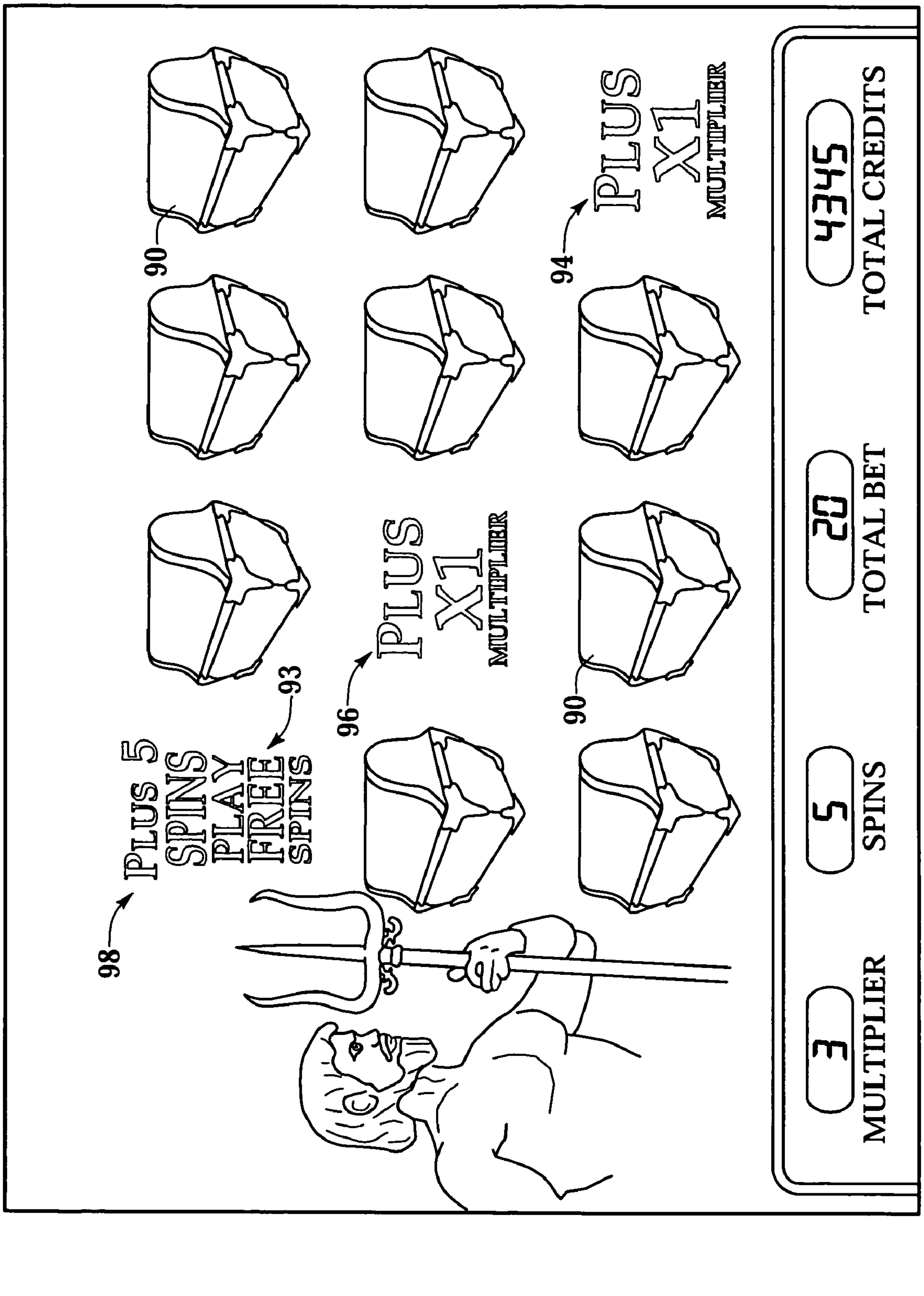
FIG. 7 illustrates another example of the selection of the player-selectable symbols of FIG. 5.

Referring also to FIGS. 6 and 7, to start the bonus game, the player is instructed to select (e.g., "Pick A Chest") one of the TREASURE CHEST symbols 90 displayed on the second video display 27. According to the illustrated embodiment of the present invention, each TREASURE CHEST symbol 90 covers a bonus outcome including the award of multipliers and the award of free spins. In the illustrated embodiment, the FREE SPINS symbol 92 award may also be accompanied by an end-bonus outcome, which is depicted as a PLAY FREE SPINS symbol 94. Further, the number of free spins awarded upon selection of the TREASURE CHEST symbol 90 that covers the free spin award is dependent on the number of TREASURE CHEST symbol 90 selections it takes for a player to select the end-bonus outcome. Put simply, the number of free spins awarded decreases as the player makes selections. For example, in FIG. 6, the player selected the TREASURE CHEST symbol 90 covering the FREE SPIN award 92 on the player's first attempt, and 15 free spins are awarded, and the bonus game is ended.

In the example illustrated in FIG. 7, the player first selects a TREASURE CHEST symbol 90, the selection of which uncovers a first multipliers 94. Second, the player selects a TREASURE CHEST symbol 90, the selection of which reveals a second multiplier 96. On the third selection, the player selects a TREASURE CHEST symbol 90, the selection of which reveals a FREE SPIN symbol 98, indicative of the award of 5 free spins, that is accompanied by the PLAY FREE SPINS symbol 93. The value of the end-bonus award (e.g., the number of free spins) is based on how many picks it takes a player to select the TREASURE CHEST symbol 90 covering the end-bonus award. In one embodiment of the present invention, a table stored in the memory 32 of the gaming terminal 10 lists the end-bonus awards corresponding to the number of selections to uncover the free spin award. For example, if the player selects the TREASURE CHEST symbol 90 covering the PLAY FREE SPINS symbol 93 on the player's first selection, 15 spins may be awarded; if on the second selection, 8 free spins may be awarded (in addition to any award for the first selection); if on the third selection, 5 free spins may be awarded (in addition to any award for the first and second selections); and so on.

In the illustrated bonus game, the award of free spins and multiplier are used in a subsequent reel-spinning game, similar to the basic game, conducted on the gaming terminal 10. According to one embodiment of the present invention, the subsequent reel-spinning game is identical to the basic game, the displays of which are shown in FIGS. 3 and 4. For example, if the result of the player's selection in the bonus game is as shown in FIG. 6, the player has 15 free spins to use in the subsequent reel spinning game. The player is awarded credits for those outcomes in this reel spin during the player's 15 free spins that correspond to those listed in a stored pay table. If the result of the player's section in the bonus game is as shown in FIG. 7, the player has 5 free spins to use in the subsequent reel spinning game, and the total credits awarded when using the free spins is multiplied by the times-three multiplier awarded during the selection bonus game.

The value of the end-bonus outcome (e.g., the number of free spins) is based on how many selections it takes the player to select the TREASURE CHEST symbol 90 covering the end-bonus outcome. Reducing the value of the end-bonus outcome in the above-described manner allows for a moderated level of volatility in a high volatility style game. This novel feature counters the typical penalty of selecting the end-bonus outcome on an early pick by raising the value of the award associated with the selection of the end-bonus outcome.

According to an alternative embodiment of the present invention, the end-bonus outcome does not have an associated value, but the other bonus-game outcomes masked by the TREASURE CHEST symbols 90 (FIG. 5) do have an associated value. One or more of these values decreases with each selection, by the player, of a TREASURE CHEST 90 symbol until the player selects the TREASURE CHEST symbol 90 masking the end-bonus outcome. These values may include free spins, credits, multipliers, or other awards. In other alternative embodiments, more than one end-bonus outcome may be masked by a TREASURE CHEST 90 symbol.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method for conducting a wagering game on a gaming terminal, the method comprising:

receiving, via a wager input device, a wager for a wagering game at a gaming terminal;

displaying, on a display of the gaming terminal, a plurality of player-selectable game elements for the wagering game, the plurality of player-selectable game elements including an end-game outcome and one or more non-end-game outcomes, the end-game outcome being associated with an end-game award and an expected value, and the one or more non-end-game outcomes being associated with non-end-game awards;

receiving, from a player of the wagering game, selections of the plurality of player-selectable game elements until the end-game outcome is selected, the selections including at least one of the non-end-game outcomes;

decreasing a quantity of the end-game award according to a number of the selected non-end-game outcomes, the decreased quantity providing less than the expected value associated with the end-game outcome;

awarding the non-end-game awards associated with the selected non-end-game outcomes; and awarding, upon selection of the end-game outcome, the end-game award, the awarded non-end-game awards being combined with the end-game award to provide the expected value associated with the end-game outcome.

2. The method of claim 1, wherein one of the player-selectable game elements includes the end-game outcome and the other player-selectable game elements are all non-end-game outcomes.

3. The method of claim 1, wherein the end-game award comprises a number of free spins of a reel-spinning wagering game.

4. The method of claim 1, wherein the one or more non-end-game outcomes are selected from the group consisting of free spins of a reel-spinning game, credits, and multipliers.

5. The method of claim 1, comprising:

masking the end-game award and the non-end-game awards; and revealing the end-game award or the non-end-game award upon selection of the corresponding end-game outcome or non-end-game outcome.

6. The method of claim 1, wherein the wagering game comprises a basic game and a bonus game, the method further comprising:

conducting a basic game in response to acceptance of a wager from the player of the gaming terminal, the basic game comprises a reel-spinning wagering game; and initiating the bonus game in response to a predetermined outcome in the basic game, the bonus gaming having the plurality of player-selectable game elements.

7. A gaming terminal for conducting a wagering game, comprising:

a display for displaying a plurality of player-selectable game elements, the plurality of player-selectable game elements including an end-game outcome and one or more non-end-game outcomes, the end-game outcome being associated with an end-game award and an expected value, and the one or more non-end-game outcomes being associated with non-end-game awards; and an input device configured to receive, from a player of the wagering game, selections of the plurality of displayed player-selectable game elements until encountering the end-game outcome, the selections including at least one of the non-end-game outcomes, a quantity of the end-game award decreasing according to a number of selected non-end-game outcomes, the decreased quantity providing less than the expected value associated with the end-game outcome, corresponding non-end-game awards being awarded with the selected non-end-game outcomes, and upon selection of the end-game outcome, the end-game award, the awarded non-end-game awards being combined with the end-game award to provide the expected value associated with the end-game outcome.

8. The gaming terminal of claim 7, wherein one of the player-selectable game elements includes the end-game outcome and the other player-selectable game elements are all non-end-game outcomes.

9. The gaming terminal of claim 7, wherein the end-game award comprises a number of free spins of a reel-spinning game.

10. The gaming terminal of claim 7, wherein the one or more non-end-game outcomes are selected from the group consisting of free spins of a reel-spinning game, credits, and multipliers.

11. The gaming terminal of claim 7, wherein the player-selectable game elements are associated with a bonus game conducted on the gaming terminal.

12. The gaming terminal of claim 7, wherein the end-game award and the non-end-game awards are initially masked, the end-game award or the non-end-game award being revealed upon selection of the corresponding end-game outcome or the non-end-game outcome.

13. The gaming terminal of claim 7, wherein the wagering game comprises a basic game and a bonus game, the basic game being conducted in response to acceptance of a wager from the player of the gaming terminal, the basic game comprising a reel-spinning game, the bonus game being initiated in response to a predetermined outcome in the basic game, the bonus game having the plurality of player-selectable game elements.

14. A method for conducting a wagering game on a gaming terminal, the method comprising:

receiving, via a wager input device, a wager for a wagering game at a gaming terminal; displaying, on a display of the gaming terminal, a plurality of player-selectable game elements for the wagering game, at least one of the plurality of player-selectable game elements including an end-game outcome and the other player-selectable game elements including non-end-game outcomes, the end-game outcome being associated with an end-game award and an expected value, and the non-end-game outcomes being associated with non-end-game awards;

masking, on the display of the gaming terminal, the end-game awards and the non-end-game awards associated with the plurality of player-selectable game elements;

receiving, from a player of the wagering game, one or more selections of the plurality of player-selectable game elements until an end-game outcome is selected;

revealing, on the display of the gaming terminal, the end-game award or the non-end-game award upon selection of the corresponding end-game outcome or non-end-game outcome;

after receiving a selection that is not an end-game outcome, decreasing a quantity associated with each end-game award and each non-end-game awards associated with the unselected player-selectable game elements, the decreased quantity of each end-game award providing less than the expected value associated with the corresponding end-game outcome;

awarding the non-end-game awards associated with the selected non-end-game outcomes; and awarding, upon selection of an end-game outcome, the end-game award associated with the selected end-game outcome the awarded non-end-game awards being combined with the end-game award to provide the expected value associated with the end-game outcome.

15. The method of claim 14, wherein some of the end-game award and non-end-game awards comprise a number of free spins.

16. The method of claim 14, wherein some of the end-game award and non-end-game awards comprise a number of credits.

17. The method of claim 14, wherein some of the end-game award and non-end-game awards comprise multipliers.

18. The method of claim 14, wherein the displayed plurality of player-selectable game outcomes are within a bonus game of the wagering game.

19. A method for conducting a wagering game on a gaming terminal, the method comprising:

receiving, via a wager input device, a wager for a wagering game at a gaming terminal;

displaying, on a display of the gaming terminal, a plurality of player-selectable elements that initially mask a quantity, at least one of the player-selectable elements including an end-game outcome and the other player-selectable game elements including one or more non-end-game outcomes, the end-game outcome being associated with an end-game award having a variable quantity, the end-game outcome being associated with an expected value, and the one or more non-end-game outcomes being associated with a non-end-game award;

in response to a player selecting one of the non-end-game outcomes, awarding the non-end-game award associated with the selected non-end-game outcome, and decreasing a quantity of the end-game award, the decreased quantity providing less than the expected value associated with the end-game outcome; and in response to the player selecting an end-game outcome, revealing, on the display of the gaming terminal, the corresponding end-game award and awarding the end-game award associated with the selected end-game outcome, the awarded non-end-game award being combined with the end-game award to provide the expected value associated with the end-game outcome.

20. The method of claim 19, wherein the end-game award is selected from the group consisting of free spins of a reel-spinning game, credits, and multipliers.

21. The method of claim 19, wherein the wagering game comprises a basic game and a bonus game, the method further comprising:

conducting a basic game in response to acceptance of a wager from the player of the gaming terminal, the basic game comprises a reel-spinning wagering game; and initiating the bonus game in response to a predetermined outcome in the basic game, the bonus game including the displaying and revealing steps.

22. The method of claim 1, wherein the end-game award is a number of free spins of a reel-spinning wagering game, and the non-end-game awards associated with the selected non-end-game outcomes are multipliers for credits awarded by the reel-spinning wagering game during the free spins.

23. The method of claim 7, wherein the end-game award is a number of free spins of a reel-spinning wagering game, and the non-end-game awards associated with the selected non-end-game outcom

* * * * *